United States Patent
Miller et al.

(10) Patent No.: US 8,905,282 B2
(45) Date of Patent: Dec. 9, 2014

(54) ACCESSORY MOUNTING APPARATUS FOR A VEHICLE

(75) Inventors: Jason E. Miller, Linton, IN (US); Brent Terry, Bedford, IN (US); Garric Henry, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 612 days.

(21) Appl. No.: 13/180,906

(22) Filed: Jul. 12, 2011

(65) Prior Publication Data

US 2012/0180281 A1 Jul. 19, 2012

Related U.S. Application Data

(60) Provisional application No. 61/429,080, filed on Dec. 31, 2010.

(51) Int. Cl.

| B60R 11/00 | (2006.01) |
|---|---|
| B60R 7/00 | (2006.01) |
| F41A 23/00 | (2006.01) |
| B60R 7/14 | (2006.01) |
| F41A 23/52 | (2006.01) |
| F41A 27/22 | (2006.01) |

(52) U.S. Cl.
CPC . *B60R 11/00* (2013.01); *B60R 7/14* (2013.01); *F41A 23/52* (2013.01); *F41A 27/22* (2013.01); *B60R 2011/0001* (2013.01)
USPC ........... 224/558; 224/482; 224/545; 224/547; 224/555; 224/565; 89/37.04; 89/37.01

(58) Field of Classification Search
CPC ............ F41A 23/34; F41A 23/02; B60R 7/14
USPC ................. 224/482, 545, 547, 555, 558, 565; 89/37.04, 37.01
See application file for complete search history.

(56) References Cited

U.S. PATENT DOCUMENTS

| 2,143,900 | A |   | 1/1939 | Rarey |  |
|---|---|---|---|---|---|
| 2,409,618 | A |   | 10/1946 | Evans |  |
| 2,441,874 | A |   | 5/1948 | Evans |  |
| 3,261,521 | A | * | 7/1966 | Meccico et al. | ............... 224/553 |
| 4,667,565 | A |   | 5/1987 | Anderson |  |
| 5,078,309 | A | * | 1/1992 | Hull et al. | ...................... 224/482 |

(Continued)

OTHER PUBLICATIONS

Military Systems Group, "The standard for weapon mounting solutions, Swing Arms" retrieved from http://www.milsysgroup.com on Nov. 27, 2010, 3 pgs.

(Continued)

*Primary Examiner* — Brian D Nash
*Assistant Examiner* — Derek Battisti
(74) *Attorney, Agent, or Firm* — Christopher A. Monsey

(57) ABSTRACT

An accessory mounting apparatus is provided for coupling to a vehicle roll bar. The accessory mounting apparatus illustratively includes a driver side clamping device configured to be secured to a driver side upright of the roll bar, and a passenger side clamping device configured to be secured to the passenger side upright of the roll bar. Protective sleeves cooperate with the clamping devices to protect the roll bar from damaging contact therewith. A laterally extending cross member extends between the driver side clamping device and the passenger side clamping device.

19 Claims, 7 Drawing Sheets

(56) References Cited

U.S. PATENT DOCUMENTS

| | | | |
|---|---|---|---|
| 5,332,134 A * | 7/1994 | Chen | 224/422 |
| 5,347,740 A * | 9/1994 | Rather et al. | 42/94 |
| 6,338,218 B1 * | 1/2002 | Hegler | 42/94 |
| 6,726,074 B2 * | 4/2004 | Boys | 224/482 |
| 6,869,120 B2 * | 3/2005 | Johnson et al. | 296/37.12 |
| 7,415,790 B1 * | 8/2008 | Ruhland et al. | 42/94 |
| 7,610,842 B1 | 11/2009 | Brooks | |
| 7,770,767 B2 * | 8/2010 | Bartholdy | 224/401 |
| 2002/0088831 A1 * | 7/2002 | Morford | 224/311 |
| 2005/0257680 A1 | 11/2005 | Russell | |
| 2009/0090758 A1 * | 4/2009 | Bartholdy | 224/571 |
| 2009/0159540 A1 * | 6/2009 | Meeks | 211/64 |
| 2010/0005644 A1 | 1/2010 | Schneider et al. | |
| 2010/0199835 A1 * | 8/2010 | Schuchman | 89/37.01 |

OTHER PUBLICATIONS

Military Systems Group, "The standard for weapon mounting solutions, Gun Mounts" retrieved from http://www.milsysgroup.com on Nov. 27, 2010, 7 pgs.

* cited by examiner

ACCESSORY MOUNTING APPARATUS FOR A VEHICLE

CROSS-REFERENCE TO RELATED APPLICATION

This application claims priority to U.S. Provisional Patent Application Ser. No. 61/429,080, filed Dec. 31, 2010, the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND AND SUMMARY OF THE DISCLOSURE

The present disclosure relates generally to an accessory mounting apparatus for a vehicle and, more particularly, to an accessory mounting apparatus operably coupled to laterally spaced uprights of a vehicle roll bar.

Vehicles, such as all terrain vehicles (ATVs), are used for a variety of applications in rugged conditions. Depending upon the use of the vehicle, the operator may desire to have different accessories (such as cameras, surveying equipment, illumination devices, weapons, etc.) supported by the vehicle. A typical area of support is the roll bar of the vehicle. However, conventional roll bar mounting arrangements often pinch and deform the roll bar during installation and operation. As such, the integrity of the roll bar may be degraded, and the stability of the accessory may be reduced.

Accordingly, an accessory mounting apparatus for a vehicle roll bar that protects the integrity of the roll bar during installation and operation while providing enhanced stability of the accessory is desired.

According to an illustrative embodiment of the present disclosure, a mounting apparatus for a vehicle roll bar includes a pintle for rotatably supporting an accessory, and a bracket coupled to the pintle. A first clamping device includes first and second gripping members, having arcuate inner surfaces configured to be positioned on opposing sides of a first upright of a vehicle roll bar. The gripping members are operably coupled to the bracket. A protective sleeve is received between the first and second gripping members and provides a bearing surface against the roll bar.

According to a further illustrative embodiment of the present disclosure, a mounting apparatus for a vehicle roll bar includes a first clamping device having first and second gripping members with inner arcuate surfaces configured to be positioned on opposing sides of a first upright of a vehicle roll bar. A first protective sleeve is received within the gripping members and provides a bearing surface against the first upright of the vehicle roll bar. An accessory mount is operably coupled to the first clamping device and is configured to support an accessory. A second clamping device includes first and second gripping members with inner arcuate surfaces configured to be positioned on opposing sides of a second upright of the vehicle roll bar. A second protective sleeve is received within the gripping members of the second clamping device and provides a bearing surface against the second upright of the vehicle roll bar. A cross member includes a first end operably coupled to the first clamping device, and a second end operably coupled to the second clamping device, and an adjustment device configured to move the first end relative to the second end.

According to another illustrative embodiment of the present disclosure, a method of installing an accessory mount on a vehicle includes the steps of providing a roll bar including laterally spaced first and second uprights, fitting a first protective sleeve over the first upright, and clamping opposing first and second gripping members of a first clamping device around the first protective sleeve. The method further includes the steps of supporting a pintle from the first clamping device, and rotatably coupling an accessory to the pintle.

According to a further illustrative embodiment of the present disclosure, a method of installing an accessory mount on a vehicle includes the steps of providing a roll bar including a driver side upright and a passenger side upright, snap fitting a driver side protective sleeve over the driver side upright, and coupling together inner and outer clamping plates of a driver side clamping device by a fastener such that inner and outer gripping members secure the driver side protective sleeve to the driver side upright. The method further includes the steps of supporting a laterally extending driver side portion of a cross member by the driver side clamping device, slidably coupling a passenger side portion of the cross member with the driver side portion of the cross member, adjusting the relative position of opposing ends of the cross member, and securing the passenger side portion of the cross member relative to the driver side portion of the cross member. The method also includes the steps of snap fitting a passenger side protective sleeve over the passenger side upright, coupling the passenger side portion of the cross member to a passenger side clamping device, coupling together inner and outer clamping plates of the passenger side clamping device by a fastener such that inner and outer gripping members secure the passenger side protective sleeve to the passenger side upright. The method also includes the step of coupling an accessory to a mount supported by the passenger side clamping device.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Figure 1:
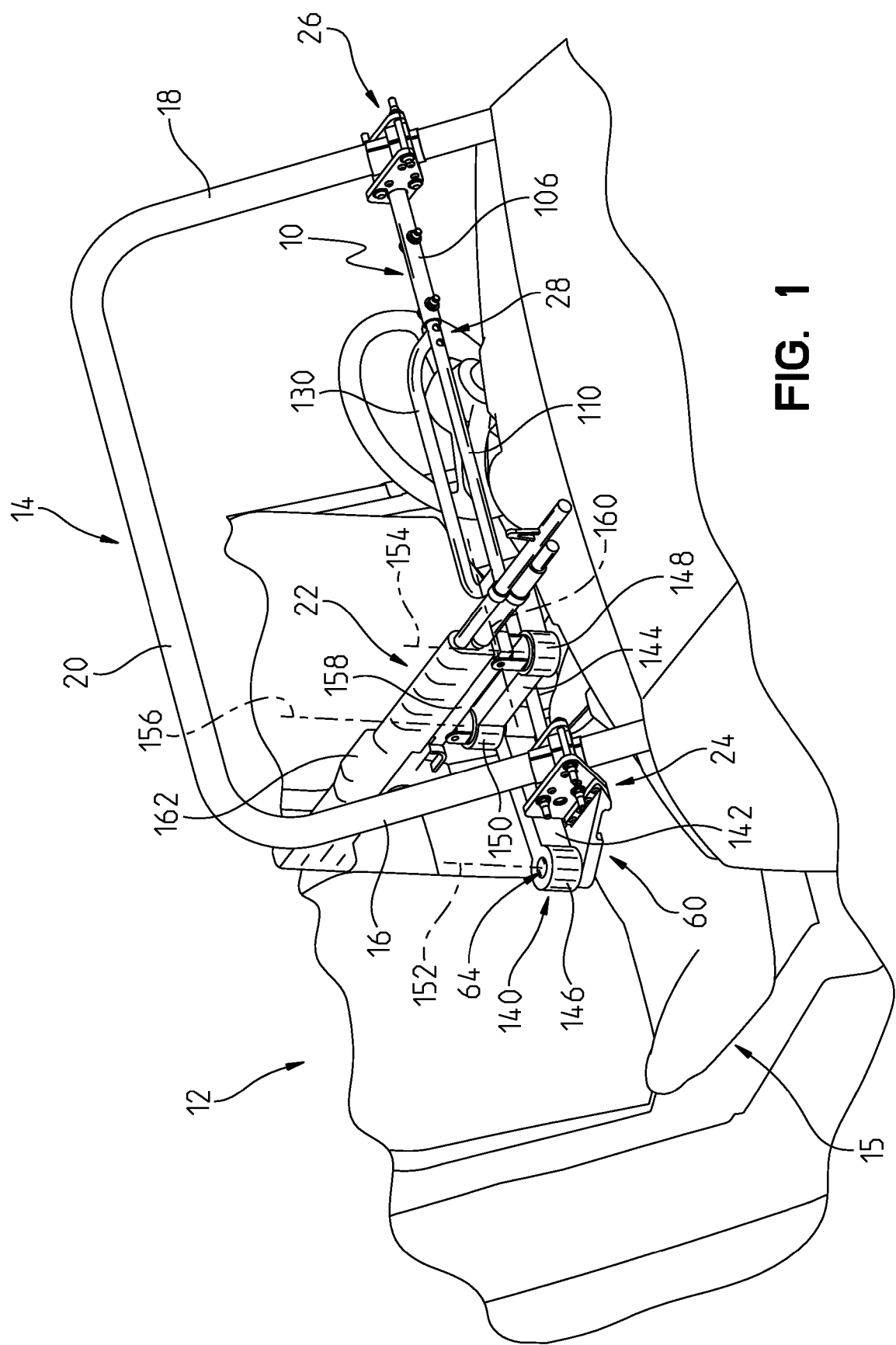
FIG. 1 is a front perspective view of an illustrative accessory mounting apparatus coupled to a vehicle roll bar.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring initially to FIG. 1, an accessory mounting apparatus 10 according to an illustrative embodiment of the present disclosure is shown coupled to a vehicle, such as an all terrain vehicle (ATV) 12 including a laterally extending roll bar 14 to protect occupants in a passenger portion 15 of the vehicle 12. The roll bar 14 may be of conventional design and includes a hollow cylindrical tube (illustratively steel) formed to have an upwardly extending first or passenger side upright 16, an upwardly extending second or driver side upright 18, and an upper connecting member 20.

The accessory mounting apparatus 10 illustratively extends laterally between passenger side upright 16 of a roll bar 14 and driver side upright 18 of the roll bar 14. The accessory mounting apparatus 10 may support a variety of different accessories 22 for use by occupants in the passenger portion 15 of the vehicle 12. While in the illustrative embodiment, accessory 22 is shown as a machine gun, it should be appreciated that other commonly used accessories may be substituted therefore, such as cameras, surveying equipment, and illumination devices.

Figure 2:
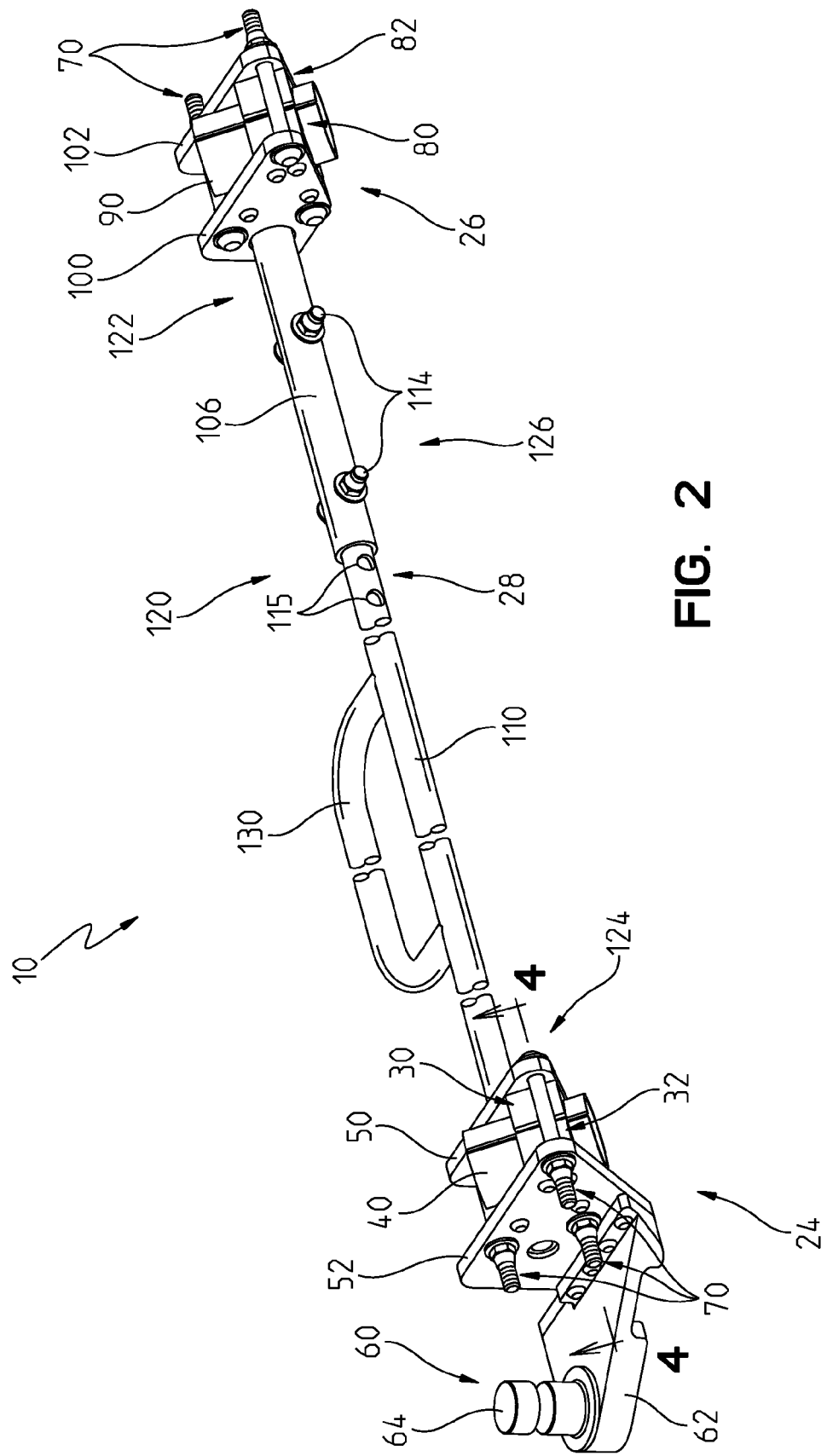
FIG. 2 is a top perspective view of the accessory mounting apparatus of FIG. 1.
Figure 3:
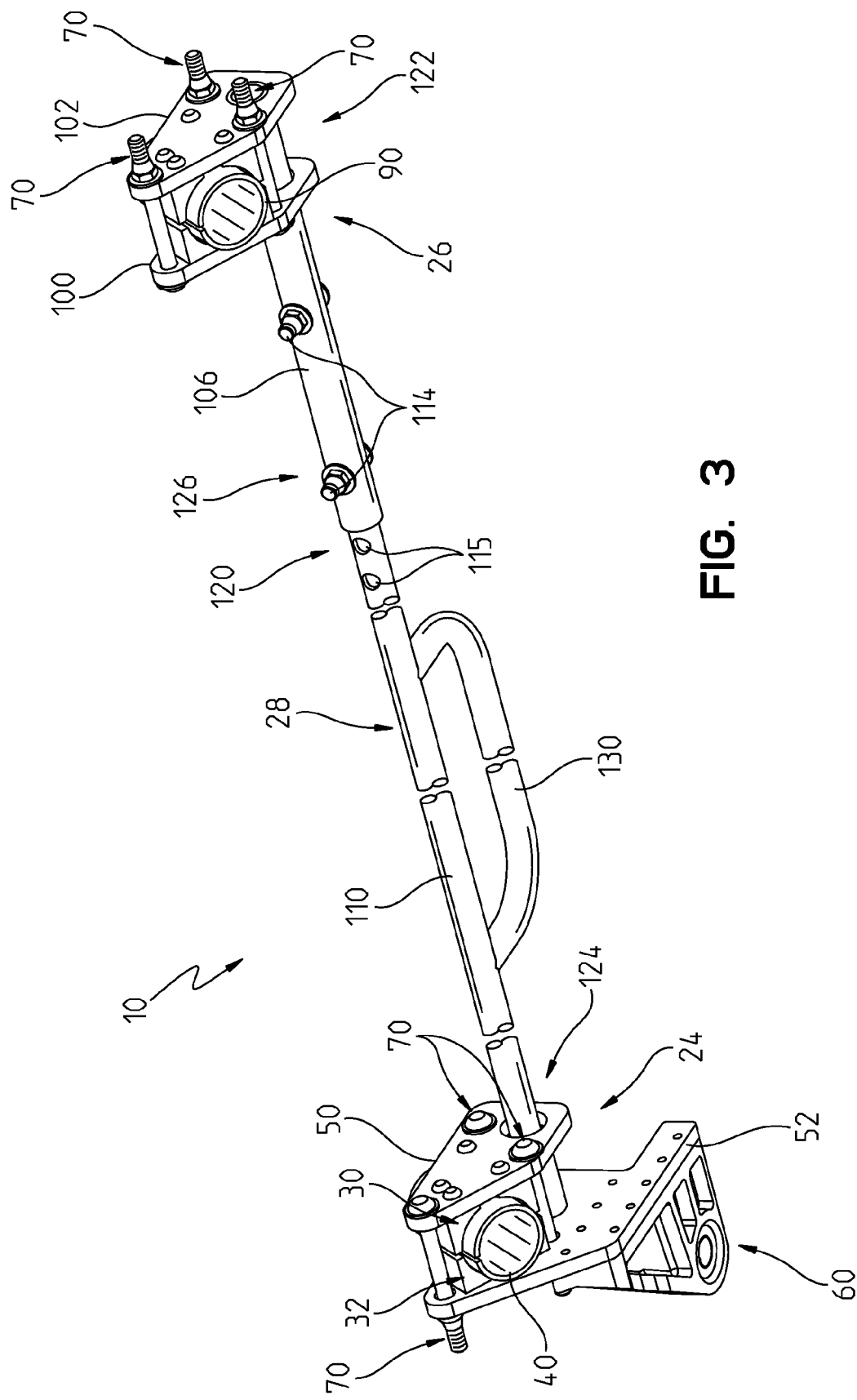
FIG. 3 is a bottom perspective view of the accessory mounting apparatus of FIG. 1.

With reference now to FIGS. 2 and 3, the accessory mounting apparatus 10 includes a first or passenger side clamping device 24 configured to operably couple to the passenger side upright 16, and a second or driver side clamping device 26 configured to operably couple to the driver side upright 18. A cross member 28 extends laterally between the passenger side clamping device 24 and the driver side clamping device 26.

Figure 4:
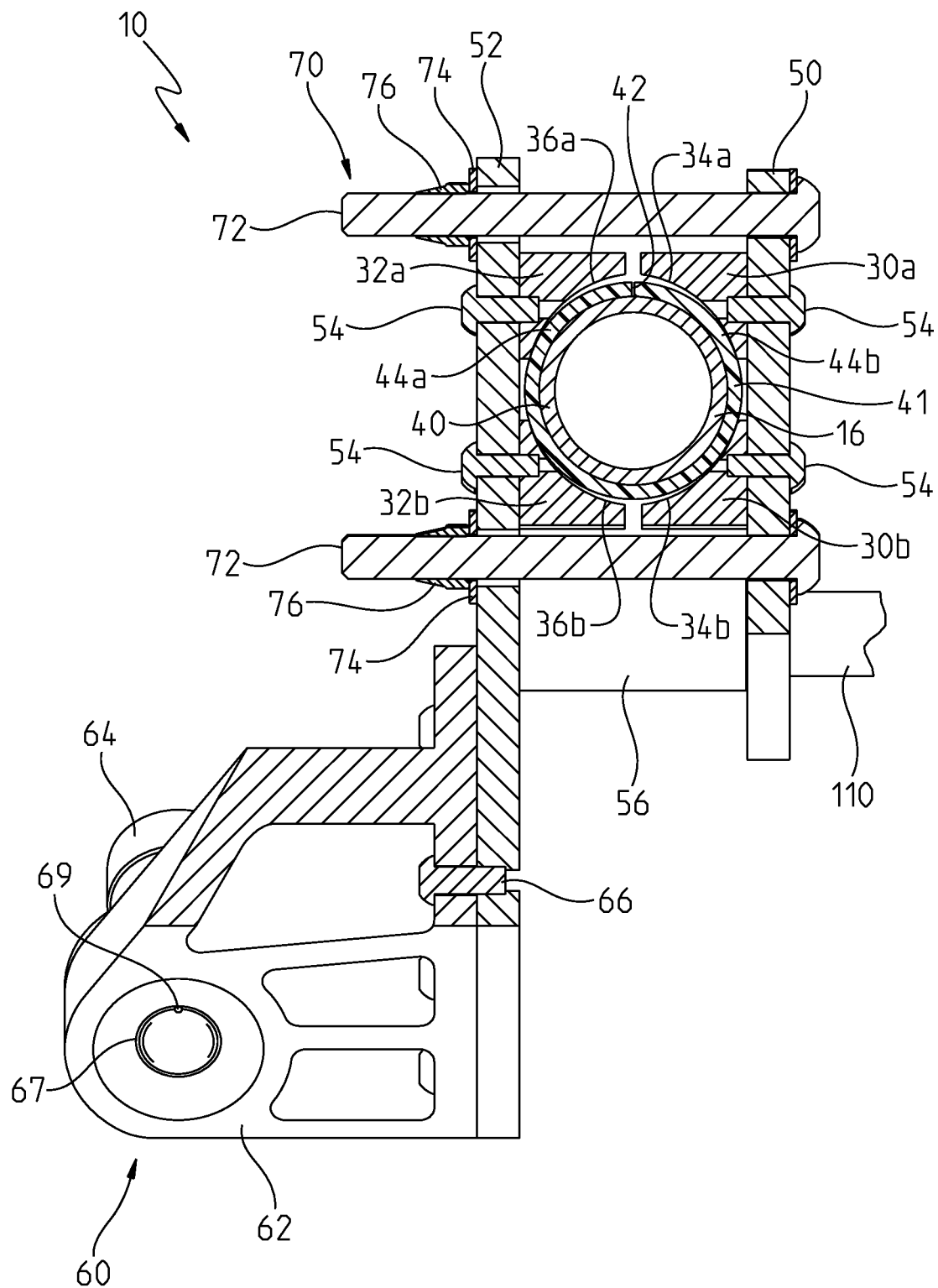
FIG. 4 is a cross-sectional view taken along line 4-4 of FIG. 2.
Figure 5:
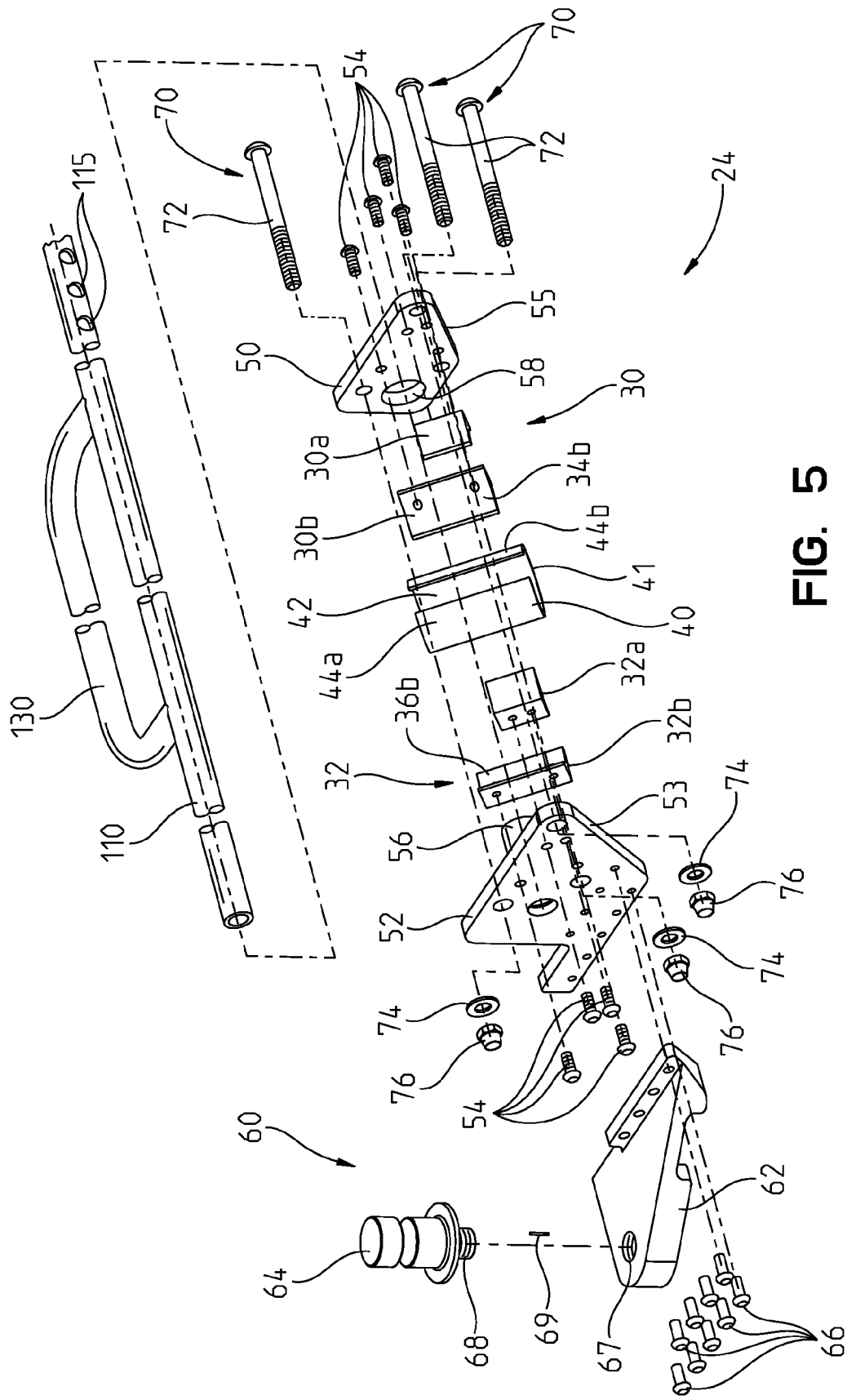
FIG. 5 is an exploded perspective view of the passenger side clamping device of the accessory mounting apparatus of FIG. 2.
Figure 6:
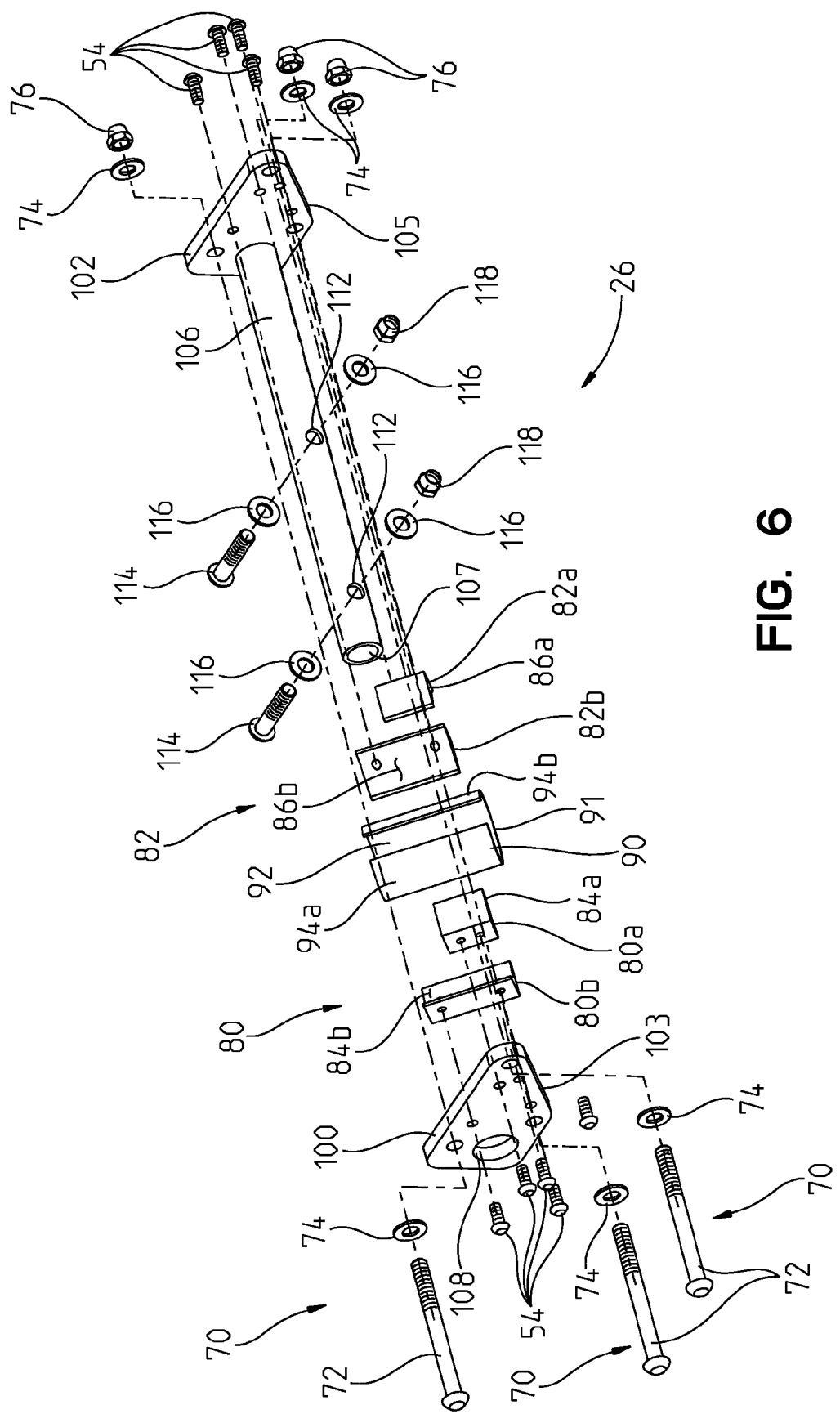
FIG. 6 is an exploded perspective view of the driver side clamping device of the accessory mounting apparatus of FIG. 2.

With reference to FIGS. 4 and 5, the passenger side clamping device 24 includes a inner or first gripping member 30 and an opposing outer or second gripping member 32. Illustratively, each gripping member 30 and 32 is formed by cooperating portions 30a, 30b and 32a, 32b having arcuate inner surfaces 34a, 34b and 36a, 36b, respectively. More particularly, the first gripping member 30 may be collectively formed of front portion 30a and rear portion 30b, while the second gripper member 32 may be collectively formed of first portion 32a and second portion 32b. In other illustrative embodiments, the first and second gripping members 30 and 32 may be formed as a single integral component defining the inner arcuate surfaces 34 and 36, respectively.

The arcuate inner surfaces 34a, 34b and 36a, 36b of the gripping members 30 and 32 are configured to be positioned on opposing sides of the passenger side upright 16. The gripping members 30 and 32 are illustratively formed of a high strength fatigue resistant metal. Illustratively, the gripping members 30 and 32 are formed of 6061 aluminum to provide sufficient strength while being relatively light weight. Illustratively, the gripping members 30 and 32 are configured to be removed and replaced, by using common tools, with similar gripping members 30 and 32 having dimensions compatible with a larger or smaller diameter upright 16 of roll bar 14.

A first or passenger side protective sleeve 40 is concentrically received over the passenger side upright 16 of roll bar 14 and is positioned within the arcuate surfaces 34, 36 of the gripping members 30, 32. The sleeve 40 includes a substantially cylindrical side wall 41 having a longitudinally extending slot 42. Illustratively, the side wall 41 is defined by inwardly biased first and second portions or arms 44a, 44b. The arms 44a, 44b of the protective sleeve 40 are configured to conform to the curvature of the inner surfaces 34 and 36 of the gripping members 30 and 32 to provide an inner bearing surface against the roll bar 14. As such, the protective sleeve 40 provides an insulator between the gripping members 30, 32 and the roll bar 14 to prevent potentially damaging contact therebetween. Illustratively, the protective sleeve 40 includes a side wall 41 formed of a polymer, such as a polyoxymethylene (POM), and having a thickness of about 0.125 inches. In one illustrative embodiment, the protective sleeve 40 is formed of Delrin®, available from DuPont Engineering Polymers of Wilmington, Del. As may be appreciated, the protective sleeve 40 is dimensioned to cooperate with the gripping members 30, 32.

The inner gripping member 30 is operably coupled to an inner or first clamping plate 50, while the outer gripping member 32 is operably coupled to an outer or second clamping plate 52. In the illustrative embodiment, the gripping members 30 and 32 are secured to the clamping plates 50 and 52 through conventional fasteners 54. Other coupling means may be substituted therefore, including welding and/or adhesives. However, the use of fasteners 54 provides for reduced inspection costs and facilitates the joining of unlike materials as compared to a welded design.

As shown in FIG. 5, the clamping plates 50 and 52 each have an asymmetrical shape including an angled leading edge 53 and 55, respectively. The angled leading edges 53 and 55 are configured to provide additional clearance proximate the lower ends of roll bar uprights 16 and 18 for mounting of additional accessories and/or windshield brackets (not shown). To accommodate the irregular shape of the clamping plates 50, 52, each front portion 30a, 32a of gripping members 30, 32 is illustratively shorter than its cooperating rear portion 30b, 32b. Illustratively, clamping plates 50 and 52 may be formed of metal, such as 6061 aluminum or C1018 steel.

A laterally inwardly extending cylindrical sleeve 56 is supported by the outer clamping plate 52. An opening 58 is formed within the inner clamping plate 50 and is configured to receive the sleeve 56 of the outer clamping plate 52.

A mount 60, including a bracket 62 and a pintle 64, is operably coupled to the outer clamping plate 52. Illustratively, the bracket 62 is formed from a high strength fatigue resistant aluminum (e.g., 7075-T6 aluminum) in order to provide for weight savings while providing sufficient strength. Conventional fasteners 66 may be used to secure the bracket 62 to a lower end of the outer clamping plate 52. The use of conventional fasteners 66 to couple the bracket 62 to the outer clamping plate 52 reduces inspection costs as compared to a welded design.

The pintle 64 includes a cylindrical shaft 68 coupled to the bracket 62 and extending upwardly therefrom. More particularly, a lower end of the shaft 68 is received within an opening 67 in the bracket 62. A key 69 may be provided to locate and/or rotatably secure the pintle 64 relative to the bracket 62. Illustratively, the pintle 64 is made from a high strength fatigue gall-resistant stainless steel (e.g., Nitronic® 60 stainless steel). The pintle 64 may be of conventional design for rotatably supporting an accessory coupled therewith.

The inner clamping plate 50 is operably coupled to the outer clamping plate 52 through a plurality of adjustable couplers 70. Illustratively, the couplers 70 each include a bolt 72 passing through a washer 74 and threadably received within a nut 76. When installed on the passenger side upright 16, the inner and outer clamping plates 50 and 52 are forced towards each other by the couplers 70. In turn, the gripping members 30 and 32 compress the protective sleeve 40 around the upright 16. In the illustrative embodiment, the sleeve 40 has an inner diameter of about 2 inches when in a relaxed mode (i.e., no external forces applied), and an inner diameter of about 1.65 inches when compressed around the upright 16 by the passenger side clamping device 24.

The driver side clamping device 26 includes similar features to the passenger side clamping device 24. For example, the driver side clamping device 26 includes a inner or first gripping member 80 and an opposing outer or second gripping member 82. Illustratively, each gripping member 80 and 82 is formed by cooperating portions 80a, 80b and 82a, 82b having arcuate inner surfaces 84a, 84b and 86a, 86b, respectively. More particularly, the first gripping member 80 may be collectively formed of front portion 80a and rear portion 80b, while the second gripper member 82 may be collectively formed of first portion 82a and second portion 82b. In other illustrative embodiments, the first and second gripping members 80 and 82 may be formed as a single integral component defining the inner arcuate surfaces 84 and 86, respectively.

The arcuate inner surfaces 84a, 84b and 86a, 86b of the gripping members 80 and 82 are configured to be positioned on opposing sides of the driver side upright 18. The gripping members 80 and 82 are illustratively formed of a high strength fatigue resistant metal, such as 6061 aluminum. Illustratively, the gripping members 80 and 82 are configured to be removed and replaced, by using common tools, with similar gripping members 80 and 82 having diameters compatible with a larger or smaller diameter upright 18 of roll bar 14.

A second or driver side protective sleeve 90 is concentrically received within the gripping members 80 and 82 and may be identical to the passenger side protective sleeve 40 as detailed above. More particularly, the passenger side protective sleeve 90 is concentrically received over the driver side upright 18 of roll bar 14 and is positioned within the arcuate surfaces 84, 86 of the gripping members 80, 82. The sleeve 90 includes a substantially cylindrical side wall 91 having a longitudinally extending slot 92. Illustratively, the side wall 91 is defined by inwardly biased first and second portions or arms 94a, 94b. The arms 94a, 94b of the protective sleeve 90 are configured to conform to the curvature of the inner surfaces 84 and 86 of the gripping members 80 and 82 to provide an inner bearing surface against the roll bar 14. As such, the protective sleeve 90 provides an insulator between the gripping members 80, 82 and the roll bar 14 to prevent potentially damaging contact therebetween. As may be appreciated, the protective sleeve 90 is dimensioned to cooperate with the gripping members 80, 82.

The inner gripping member 80 is operably coupled to an inner or first clamping plate 100, while the outer gripping member 82 is operably coupled to an outer or second clamping plate 102. In the illustrative embodiment, the gripping members 80 and 82 are secured to the clamping plates 100 and 102 through conventional fasteners 54. To accommodate the irregular shape of the clamping plates 100, 102, and more particularly angled leading edges 103 and 105, respectively, each front portion 80a, 82a of gripping members 80, 82 is illustratively shorter than its cooperating rear portion 80b, 82b. Illustratively, clamping plates 100 and 102 may be formed of metal, such as 6061 aluminum or C1018 steel.

The inner clamping plate 100 is operably coupled to the outer clamping plate 102 through a plurality of adjustable couplers 70. As detailed above, the couplers 70 each illustratively include a bolt 72 passing through a washer 74 and threadably received within a nut 76. When installed on the driver side upright 18, the inner and outer clamping plates 100 and 102 are forced towards each other by the couplers 70. In turn, the gripping members 80 and 82 compress the protective sleeve 90 around the upright 18.

In certain illustrative embodiments, the driver side clamping device 26 may include a mount similar to mount 60 of the passenger side clamping device 24. For example, driver side clamping device 26 may include a mirror image of mount 60 for supporting driver accessible hardware or accessories.

A first or driver side portion 106 of the cross member 28 is coupled to the outer clamping plate 102. Illustratively, the driver side portion 106 comprises a longitudinally extending cylindrical sleeve having a receiving chamber 107. The driver side portion 106 extends through an opening 108 in the inner clamping plate 100. A second or passenger side portion 110 of the cross member 28 includes a first end slidably received within the chamber 107 of the driver side portion 106 of cross member 28. A second end of the passenger side portion 110 of the cross member 28 is slidably received within the sleeve 56 of the passenger side clamping device 124.

A pair of openings 112 is formed in the driver side portion 106 and extends perpendicular to chamber 107. Similarly, a plurality of openings 115 extend through the passenger side portion 110 and are selectively alignable with openings 112 of the driver side portion 106. A pair of bolts 114 pass through openings 112 and 115 to secure the first and second portions 106 and 110 of the cross member 28 relative to each other. The bolts 114 illustratively pass through washers 116 and are threadably coupled to nuts 118.

As noted above, the driver side portion 106 of the cross member 28 is configured to slidably receive the passenger side portion 110. The plurality of openings 115 in the passenger side portion 110 are configured to selectively align with the openings 112 formed in the driver side portion 106 and secured in position by the bolts 114. In other words, the driver side portion 106 slidably receives in a telescoping manner the passenger side portion 110 to provide an adjustment device 120 of the cross member 28. More particularly, the adjustment device 120 permits a first end 122 of the cross member 28 to be adjusted relative to a second end 124 of the cross member 28. The bolts 114 received within the aligned openings 112 and 115 of the respective cross member portions 106 and 110 define a locking device 126 to secure the relative position of the portions 106 and 110, and therefore the first end 122 of the cross member 28 relative to the second end 124 of the cross member 28.

A handle 130 may be positioned intermediate the first and second ends 122 and 124 of the cross member 28. The handle 130 is configured for use by a vehicle occupant to stabilize him during operation of the accessory 22, particularly when the vehicle 12 is moving.

With further reference to FIG. 1, the mount 60 is configured to rotatably support accessory 22. In the illustrative embodiment, a swing arm 140 is supported by the pintle 64 of mount 60 and includes first and second arms 142 and 144, respectively. A first end 146 of the swing arm 140 is coupled to the pintle 64 to facilitate rotation of the first arm 142 about a first vertical axis 152. The swing arm 140 includes a second end 148 supporting the accessory 22 for rotation about a second vertical axis 154. An intermediate pivot joint 150 is provided between the first end 146 and the second end 148 and is configured to provide for rotational movement of the first arm 142 relative to the second arm 144 about a third vertical axis 156.

A cradle 158 is illustratively supported by the second end 148 of the swing arm 140 for rotation about the second vertical axis 154. In one illustrative embodiment, the cradle 158 is supported for pivoting movement about a horizontal axis 160. Illustratively, the cradle 158 may be configured to support a 7.62 mm machine gun 162. In one illustrative embodiment, the swing arm 140 is an SA4 swing arm and the cradle 158 is an H24-6 machine gun mount.

In the illustrative embodiment, the accessory mounting apparatus 10 is capable of sustaining anticipated forces without yielding of components of the mounting apparatus 10 or roll bar 14. More particularly, the mount 60 coupled to the passenger side clamping device 24 is configured to withstand without yielding an approximately 639 lb. recoil force and an approximately 180 lb. vertical force on a moment arm of about 36 inches.

Figure 7:
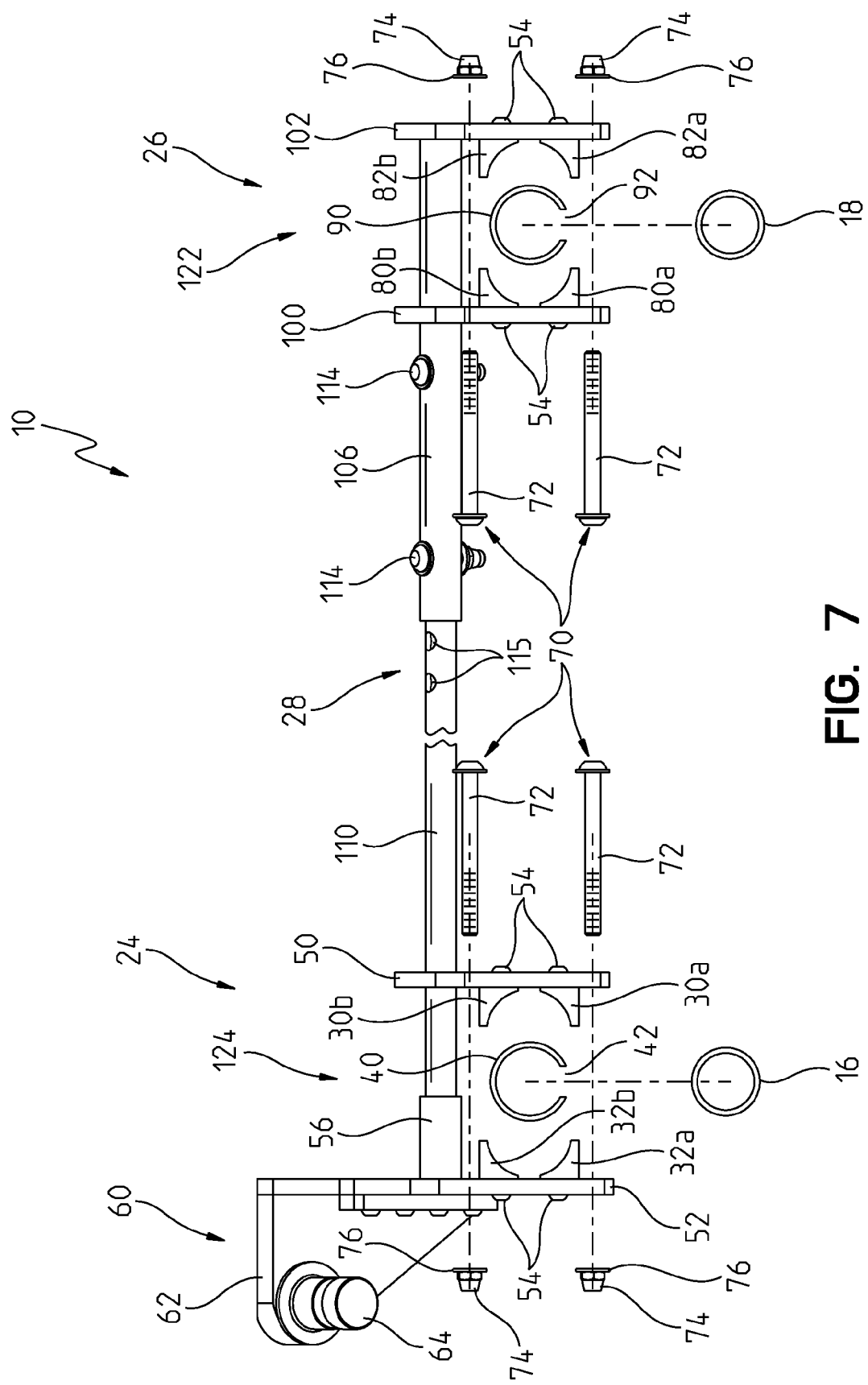
FIG. 7 is a partially exploded bottom perspective view of the accessory mounting apparatus of FIG. 2.

With reference now to FIGS. 1 and 7, installation of the accessory mounting apparatus 10 will be further detailed. An illustrative installation method includes the steps of providing the roll bar 14 with laterally spaced passenger side and driver side uprights 16 and 18, respectively. The driver side protective sleeve 90 is snap fit over the driver side upright 18. More particularly, the slot 92 of the driver side protective sleeve 90 is passed over the driver side upright 18 such that the opposing portions 94a, 94b of the sleeve 90 bias inwardly toward each other after passing over the circumference of the upright 18 and snap into position. The inner and outer clamping plates 100 and 102 supporting the inner and outer gripping members 80 and 82 are then secured together using the couplers 70. The second portion 110 of the cross member 28 is then slidably received within the first portion 106 of the cross member 28. The second and first portions 110 and 106 are then adjusted such that the first and second ends 122 and 124 are positioned with the appropriate spacing for the uprights 16 and 18 of the vehicle roll bar 14.

The bolts 114 are then used to secure the second portion 110 of the cross member relative to the first portion 106. The passenger side protective sleeve 40 is then snap fit over the passenger side upright 16. Again, the slot 42 of the passenger side protective sleeve 40 is passed over the passenger side upright 16 such that the opposing portions 44a and 44b are biased over the circumference of the upright 16 and snap into position. The inner clamping plate 50 is then slid over the second portion 110 of the cross member 28 while the sleeve 56 of the outer clamping plate 52 receives the second end 124 of the cross member 28. The inner and outer clamping plates 50 and 52 supporting the inner and outer gripping members 30 and 32 are then secured together using the couplers 70. The bolts 72 for both the driver side clamping device 26 and the passenger side clamping device 24 are then torqued to specified values to secure them to the roll bar 14. The torque values are illustratively those recommended for the selected fastener grade and size.

Now that the accessory mounting apparatus is secured to the vehicle roll bar 14, the accessory 22 may be mounted in position. The first end 146 of the swing arm 140 is coupled to the pintle 64. Next, cradle 158 is rotatably coupled to second end 148 of the swing arm 140. Machine gun 162 may then be secured to the cradle 158 which, as noted above, is supported for pivoting movement about horizontal axis 160.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A mounting apparatus for a vehicle roll bar, the mounting apparatus comprising:
   a pintle for rotatably supporting an accessory;
   a bracket coupled to the pintle;
   a first clamping device including first and second gripping members having arcuate inner surfaces configured to be positioned on opposing sides of a first upright of a vehicle roll bar, the gripping members operably coupled to the bracket; and
   a protective sleeve received between the first and second gripping members and providing a bearing surface against the roll bar;
   wherein the first clamping device further includes:
      a first clamping plate coupled to the first gripping member;
      a second clamping plate coupled to the second gripping member; and
      a plurality of fasteners disposed at least through at least two sections of said first and second clamping plates and extending on opposing sides of said roll bar, said plurality of fasteners extending between the first clamping plate and the second clamping plate and thereby forcing the first and second gripping members toward each other for securing the protective sleeve around the roll bar, said plurality of fasteners are further disposed through said first and second clamping plates so that a side of at least two of said fasteners are positioned on a respective end of said first and second gripping member that faces away from said roll bar.

2. The mounting apparatus of claim 1, further comprising:
   a cross member having a first end supported by the first clamping device and extending laterally from the pintle bracket; and
   a second clamping device coupled to a second upright of the vehicle roll bar and supporting a second end of the cross member.

3. The mounting apparatus of claim 2, wherein the cross member includes a first end operably coupled to the first clamping device, a second end operably coupled to the second clamping device, and an adjustment device configured to move the first end relative to the second end.

4. The mounting apparatus of claim 3, wherein:
   the cross member includes a first portion supporting the first end, and a second portion supporting the second end, the first portion being telescopingly received within the second member; and
   the adjustment device includes a locking mechanism configured to secure the second portion of the cross member relative to the first portion of the cross member in one of a plurality of defined positions.

5. The mounting apparatus of claim 2, wherein:
   the second clamping device includes a pair of gripping member having inner arcuate surfaces configured to be positioned on opposing sides of the second upright of the vehicle roll bar, the gripping members operably coupled to the bracket; and a protective sleeve is concentrically received within the gripping members of the second clamping device and providing a bearing surface against the roll bar.

6. The mounting apparatus of claim 1, wherein the protective sleeve is formed of a polymer.

7. The mounting apparatus of claim 6, wherein the protective sleeve is formed of a polyoxymethylene.

8. The mounting apparatus of claim 1, wherein the protective sleeve includes opposing portions defining a longitudinally extending slot wherein the opposing portions of the sleeve are biased to snap over the roll bar.

9. The mounting apparatus of claim 1, further comprising a cradle rotatably supported by the pintle, the cradle supporting the accessory.

10. The mounting apparatus of claim 9, further comprising a swing arm coupled to the pintle for rotation about a first vertical axis, the swing arm supporting the cradle for rotation about a second vertical axis, and wherein the accessory comprises a machine gun coupled to the cradle for rotation about a horizontal axis.

11. A mounting apparatus for a vehicle roll bar, the mounting apparatus comprising:
    a first clamping device including first and second gripping members having arcuate inner surfaces configured to be positioned on opposing sides of a first upright of a vehicle roll bar;
    a first protective sleeve received within the gripping members of the first clamping device and providing a bearing surface against the first upright of the vehicle roll bar;
    an accessory mount operably coupled to the first clamping device and configured to support an accessory;
    a second clamping device including first and second gripping members having arcuate inner surfaces configured to be positioned on opposing sides of a second upright of the vehicle roll bar;
    a second protective sleeve received within the gripping members of the second clamping device and providing a bearing surface against the second upright of the vehicle roll bar; and
    a cross member having a first end operably coupled to the first clamping device, a second end operably coupled to the second clamping device, and an adjustment device configured to move the first end relative to the second end;
    wherein each of the first clamping device and the second clamping device further includes:
        a first clamping plate coupled to the first gripping member;
        a second clamping plate coupled to the second gripping member; and
    a plurality of fasteners disposed at least through at least two sections of said first and second clamping plates and extending on opposing sides of said roll bar, said plurality of fasteners extending between the first clamping plate and the second clamping plate and thereby forcing the first and second gripping members toward each other for securing the protective sleeve around the roll bar, said plurality of fasteners are further disposed through said first and second clamping plates so that a side of at least two of said fasteners are positioned on a respective end of said first and second gripping member that faces away from said roll bar.

12. The mounting apparatus of claim 11, wherein:
    the cross member includes a first portion supporting the first end, and a second portion supporting the second end, the first portion being telescopingly received within the second portion; and
    the adjustment device includes a locking mechanism configured to secure the second portion of the cross member relative to the first portion of the cross member in one of a plurality of discrete positions.

13. The mounting apparatus of claim 11, wherein the first protective sleeve and the second protective sleeve are each formed of a polymer.

14. The mounting apparatus of claim 11, wherein each of the first and second protective sleeves includes opposing portions defining a longitudinally extending slot, wherein the opposing portions of the sleeve are biased to snap over the roll bar.

15. The mounting apparatus of claim 11, wherein the accessory mount includes a pintle, and a cradle supporting an accessory is rotatably supported by the pintle.

16. The mounting apparatus of claim 15, further comprising a swing arm coupled to the pintle for rotation about a first vertical axis, the swing arm supporting the cradle for rotation about a second vertical axis, and wherein the accessory comprises a machine gun coupled to the cradle for rotation about a horizontal axis.

17. The mounting apparatus of claim 11, further comprising a handle coupled to the cross member intermediate the first end and the second end.

18. The mounting apparatus of claim 2, wherein said cross member's first end is coupled to said clamping plate, said second clamping plate is formed with an aperture such that it slideably receives said cross member through said aperature.

19. The mounting apparatus of claim 11, wherein said cross member's first end is coupled to said clamping plate, said second clamping plate is formed with an aperture such that it slideably receives said cross member through said aperature.

* * * * *